United States Patent [19]
Ono

[11] Patent Number: 4,597,668
[45] Date of Patent: Jul. 1, 1986

[54] DEVICE FOR CHECKING POSITIONAL ACCURACY

[75] Inventor: Akira Ono, Tokyo, Japan

[73] Assignee: Tokyo Shibaura Denki Kabushiki Kaisha, Kawasaki, Japan

[21] Appl. No.: 488,706

[22] Filed: Apr. 26, 1983

[51] Int. Cl.[4] .............................................. G01B 11/26
[52] U.S. Cl. .................................... 356/372; 356/138
[58] Field of Search ................ 356/138, 372, 375, 23; 250/224

[56] References Cited

U.S. PATENT DOCUMENTS

| | | | |
|---|---|---|---|
| 2,954,266 | 9/1960 | Danielson et al. | 250/224 |
| 4,326,804 | 4/1982 | Mossey | 356/23 |

*Primary Examiner*—R. A. Rosenberger
*Attorney, Agent, or Firm*—Cushman, Darby and Cushman

[57] ABSTRACT

A device for checking positional accuracy is disclosed which precisely checks the accuracy of the mounting position of a plurality of magnetic heads mounted on a rotary disk along the edge thereof. The device includes a laser which projects a laser beam in a direction at a predetermined angle with respect to the rotary disk. The laser beam is successively scattered by head gaps of the magnetic heads. A photosensor converts the scattered light components into photoelectric signals each containing two photoelectric signal components. The two photoelectric signal components of each of the photoelectric signals are differentially amplified by an operational amplifier. The operational amplifier produces successive differential signals which are supplied to a zero-crossing detector. The accuracy of the mounting position of the magnetic heads is then checked based on the interval between adjacent detected zero crossings.

14 Claims, 3 Drawing Figures

DEVICE FOR CHECKING POSITIONAL ACCURACY

BACKGROUND OF THE INVENTION

This invention relates to a device for checking positional accuracy and, more particularly, to a device for checking the relations among a plurality of positions.

There are cases where a plurality of parts must be mounted on an object in a precise positional relation to one another. For example, in a video tape recorder (VTR) two magnetic heads must be mounted on a rotary disk such that they are exactly 180 degrees out of phase from each other. If the two magnetic heads are not exactly 180 degrees out of phase from each other, mistracking will occur and the image reproduced from the video tape by the magnetic heads will be blurred. For this reason, it is important in the assembly of the VTR to check whether the two magnetic heads are exactly in the specified positional relation to each other.

Hitherto, the checking of the positional relation between the magnetic heads has been done using a pair of microscopes arranged exactly 180 degrees out of phase from each other on the rotary disk. More particularly, the positional relation between the two heads is checked by checking whether the head gaps of the magnetic heads, as seen in an enlarged view through the respective microscopes, are in register with the center of field of the microscopes. This method, however, requires a great deal of time and skill for positioning the pair of microscopes exactly 180 degrees out of phase, and the probability of error is very high. Further, the focus adjustment and observation of the parts must be done through the eyepiece of the microscopes, and the inspection criteria thus vary from one observer to the next, which leads to inconsistencies in the checking results. Still further, when the disk is rotating, a check to determine whether the heads are out of phase or not cannot be made via this method. Generally, the relative positions of the heads change according to stop and moving conditions of the disk, due to members such as bearings. As to the VTR heads, it is important to check their relative positions when the disk is in a moving condition, since this condition resembles the actual manner of use.

SUMMARY OF THE INVENTION

An object of the present invention is to provide a positional accuracy checking device which can check the relations among a plurality of positions with high operability and high precision.

According to the invention, there is provided a device for precisely checking positional accuracy, which comprises a light beam projector for projecting a light beam to a portion, where inspection parts mounted on a moving body periodically pass, a photosensor including at least two photoelectric elements successively scanned by light reflected from each of the inspection parts, a zero-crossing detector for detecting zero crossings of photoelectric signals produced from the photosensor and corresponding to the respective inspection parts and means for determining the positional relation among the inspection parts.

DETAILED DESCRIPTION OF THE PREFERRED EMBODIMENT

Figure 1:
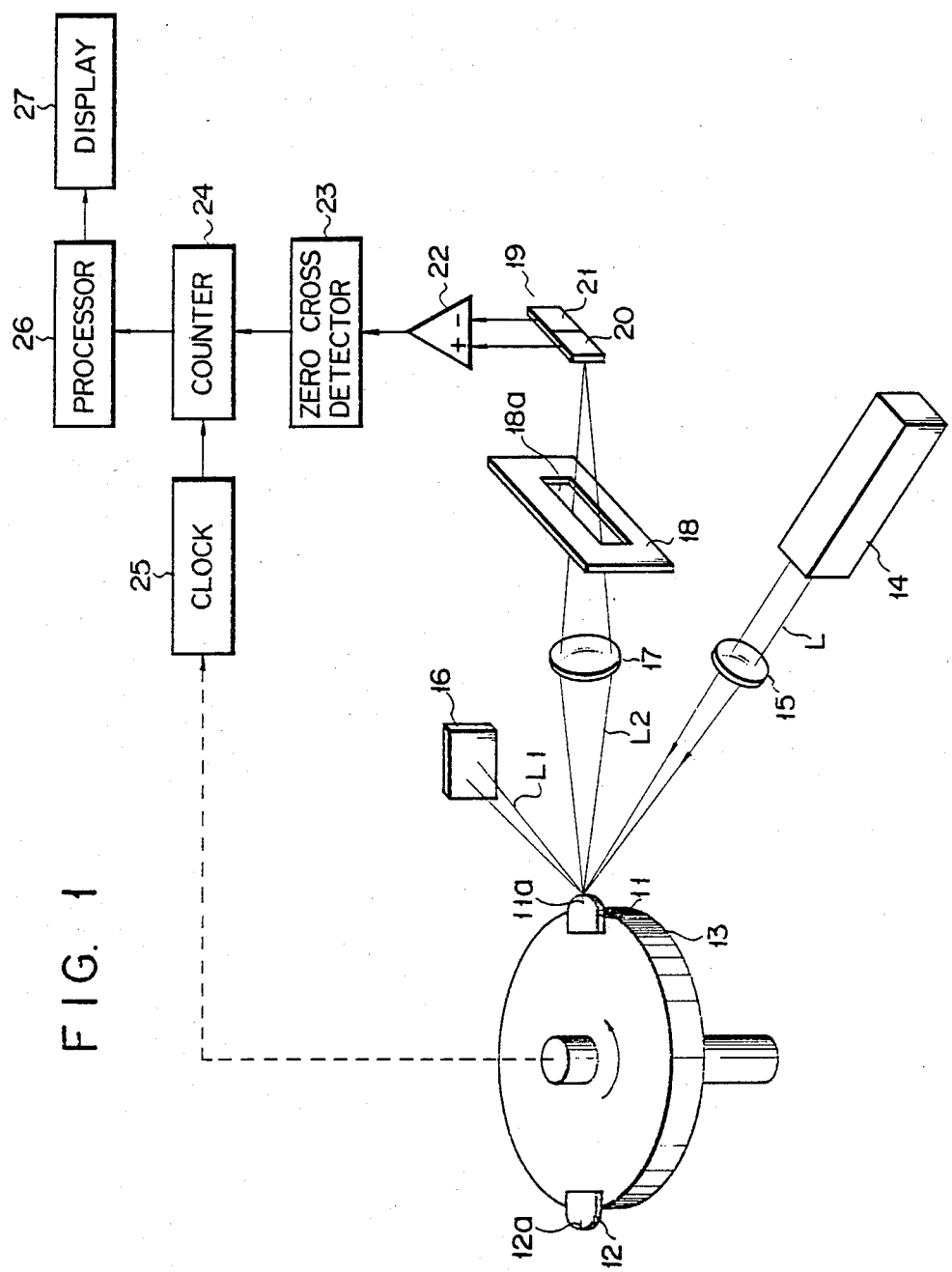
FIG. 1 is a schematic representation of an embodiment of the device for checking positional accuracy according to the invention.

FIG. 1 shows a device for checking the accuracy of the relative position of magnetic heads. Two magnetic heads 11 and 12 are mounted on a rotary disk 13 at edge positions thereof 180 degrees out of phase from each other with respect to a rotation direction of the disk. A light beam projecting unit, e.g., a laser 14 (YAG laser or HeNe laser), is disposed to produce a laser beam directed to a predetermined position of the rotary disk 13, at which the heads 11 and 12 are periodically moved by the rotary head 13. The laser 14 is positioned such that its beam is converged by a lens 15 to be incident on a curved surface of each head 11 or 12 at a predetermined angle thereto. A light shelter 16 is disposed at the position where the laser beam reflected from the curved surface of the head is directed. When the laser beam is incident on the head gap of a magnetic head, e.g., head gap 11a of the head 11, it is scattered by the head gap 11a. A convergent lens 17, a spatial filter 18 and a photosensor 19 are disposed in that order in the scattering direction.

The spatial filter 18 has a slit 18a which extends perpendicular to the longitudinal direction of the head gap 11a. The photosensor 19 has first and second photoelectric elements 20 and 21 which are arranged side by side in the longitudinal direction of the slit 18a. The photoelectric elements 20 and 21 have their output sections connected to respective noninvertine and inverting input portions of an operational amplifier 22. The operational amplifier 22 has its output portion connected to an input portion of a zero-crossing detector 23. The zero-crossing detector 24 has its output portion connected to a reset input portion of a counter 24. A clock generator 25 has its output portion connected to the input portion of the counter 24. The clock generator 25 provides a clock pulse signal which is synchronized to the rotational speed of the rotary disk 13. The counter 24 has its output portion connected to the input portion of a processor 26. The processor 26 has its output portion connected to the input portion of a display 27.

Figure 2:
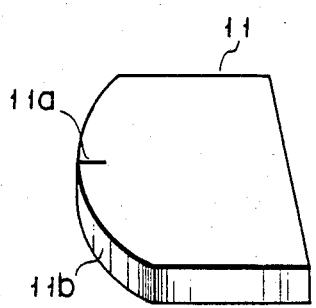
FIG. 2 is a perspective view showing a magnetic head.

In operation, when a laser beam L is produced from the laser 14 while the magnetic heads 11 and 12 are revolving about the axis of rotation of the rotary disk 13 with the rotation thereof, the beam is converged by the lens 15 toward the position past which the magnetic heads 11 and 12 are moved. When the laser beam L is converged onto the surface 11b (see FIG. 2) of the magnetic head 11, for instance, it is regularly reflected by the curved surface 11b. The regularly reflected laser light L1 is incident on and screened by the light shelter 16. However, when the laser beam L is incident on the head gap 11a of the magnetic head 11, it is scattered by the head gap 11a. The scattered laser light L2 is coupled through the convergent lens 17 and the slit 18a of the spatial filter 18 to be incident on the photosensor 19. The spatial filter 18 removes polarized laser light diffracted by portions of the magnetic head 11 other than the head face.

As the magnetic head 11 moves in the direction of the arrow (FIG. 1), the scattered laser light L2 that is incident on the photosensor 19 scans the photoelectric elements 20 and 21 thereof in that order. At this time, the photoelectric elements 20 and 21 provide outputs corresponding to the incident scattered laser light L2. These outputs are fed to the respective noninverting and inverting input portions of the operational amplifier 22. The operational amplifier 22 produces an alternating voltage E (shown in FIG. 2) having components corresponding to the outputs E1 and E2 of the photoelectric elements 20 and 21. The alternating voltage output of the operational amlifier 22 is fed to the zero-crossing detector 23. The zero-crossing detector 23 supplies a zero-crossing detection signal to the counter 24 every time it detects a zero-crossing 21 of the output of the operational amplifier 22. The counter 24 is reset in response to the zero-crossing detection signal to count clock pulses from the clock generator 25.

Figure 3:
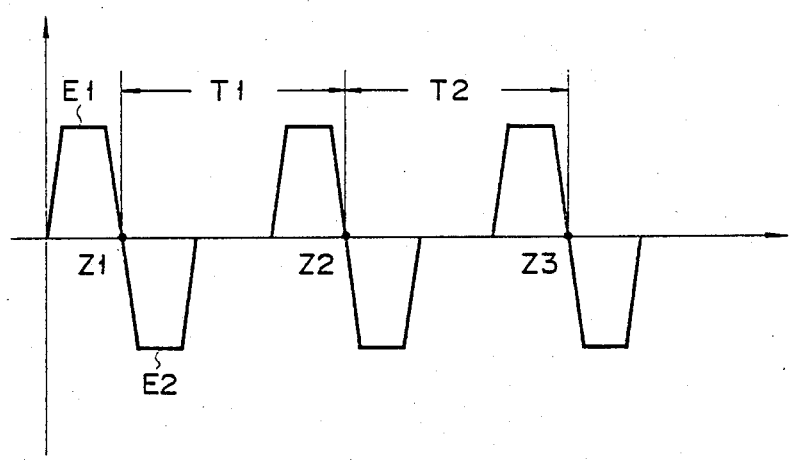
FIG. 3 is a waveform diagram showing the output of an operational amplifier in the checking device of FIG. 1.

As the disk 13 continues to rotate, the magnetic head 12 reaches the position at which the laser beam L is converged, and the head gap 12a of the magnetic head 12 comes to be illuminated by the laser light L. Like the previous case of the magnetic head 11, the scattered laser light L2 again scans the photoelectric elements 20 and 21 of the photosensor 19. Thus, the next alternating voltage (FIG. 3) is supplied from the operational amplifier 22 to the zero-crossing detector 23. The zero-crossing detector 23 supplies a zero-crossing detection signal to the counter 24 upon detection of a zero crossing 22. The counter 24 is reset by the zero-crossing detection signal. At this time, the count of the counter 24 is registered in a memory in the processor 26. The count at this time corresponds to the period T1 between the zero crossings 21 and 22. The counter 24 starts to count clock pulses again after it has been reset. When the magnetic head 11 again reaches the position of convergence of the laser beam L so that the head gap 11a is once again illuminated by the laser beam L, the operational amplifier 22 produces the alternating voltage output having a zero crossing 23. When the zero-crossing detector 23 produces a zero-crossing detection signal corresponding to the zero crossing 23, the counter 24 transfers the prevailing count, i.e., count data corresponding to the period T2, to the memory of the processor 26, when it is reset. At this time, the processor 26 compares the stored data T1 and T2. If T1=T2, it means that the magnetic heads 11 and 12 are mounted on the rotary disk 13 such that they are exactly 180 degrees out of phase from each other, that is, the deviation is zero. In this case, the processor 26 supplies data representing a deviation of "0" to the display 27 for display thereon. If T1≠T2, deviation data corresponding to the difference between the periods T1 and T2 is provided from the processor 26 to the display 27 for display thereon. In this case, the fact that the magnetic heads 11 and 12 are not exactly 180 degrees out of phase from each other is confirmed.

In the above embodiment the positional accuracy of the mounting position of two magnetic heads was checked. However, it is possible to check the accuracy of the mounting position of three or more parts. In this case, more than two zero-crossing periods are compared. Further, while in the above embodiment the accuracy of the relative position of parts mounted on a rotary object was checked, it is also possible to check the precision of positional accuracy of parts mounted on a running belt. Further, it is possible to hold the parts to be checked stationary and move the checking device, or both the parts to be checked and the checking device may be moved in a predetermined relation to one another. Moreover, the parts to be checked are not limited to magnetic heads, but the invention is applicable to the positional checking of any part for which the positional accuracy of its mounting is important.

As has been described in the foregoing, in the device for checking the positional precision according to the invention, an object on which a plurality of parts are mounted in a predetermined positional relation to one another, and the checking device for checking the precision of the mounting position of the parts, are moved relative to each other, a light beam is directed from a light beam generating device to the position past which the parts are relatively moved, a photosensor receives light beam components reflected by the inspection parts and produces signals corresponding to the incident reflected light beam components, and the precision of the mounting position of the parts is checked from the cycle periods of these signals. Thus, the positional precision can be checked readily and accurately without depending upon the skill of the inspector. Besides, even if the convergence of the projected or reflected light beam is deviated, zero crossings can be detected from the signals obtained from the photosensors. Thus, the positional precision can be accurately checked without being influenced by the deviation of convergence, i.e., the deviation from focus.

What is claimed is:

1. A device for checking positional accuracy of inspection parts on a moving object, said object having a plurality of said inspection parts mounted in a predetermined positional relation to one another, said device comprising:
   means for radiating a light beam in a fixed direction toward said object, said light beam being adapted to selectively reflect from said inspection parts in a predetermined direction;
   means for converting said light reflected by said inspection parts into electric signals indicative thereof;
   means for measuring signal intervals of said electric signals and obtaining values indicative thereof; and
   means for calculating the precision of said positional relation among said inspection parts from said values obtained from said measuring means.

2. The device for checking positional accuracy according to claim 1, wherein said light beam radiating means is a laser means for projecting a laser beam at a predetermined angle with respect to said object.

3. The device for checking positional accuracy according to claim 1, wherein said converting means further includes photosensor means scanned by scattered light from each of said inspection parts for producing at least first and second photoelectric signals, and said measuring means includes:
   (a) operational amplifier means for producing differential output signals each having a zero crossing from said first and second photoelectric signals from said photosensor,
   (b) means for detecting said zero crossings of said differential output signals from said operational amplifier, and (c) means for counting the interval between adjacent zero crossings detected by said zero-crossing detecting means.

4. The device as in claim 1 further comprising focusing means for focusing said light beam toward said object.

5. A device as in claim 4 further comprising convergent lens means for focusing said reflected light beam towards said means for converting.

6. A device for checking positional precision comprising:
   a plurality of inspection parts mounted in a predetermined positional relation on a rotating disk member, said inspection parts each having a light scattering section;
   means for projecting a light beam in a fixed direction toward said rotating disk member;
   means for converting light components scattered by said light scattering sections of said inspection parts into photoelectric signals;
   means for measuring signal intervals of said photoelectric signals from said converting means; and
   means for calculating the accuracy of said positional relation among said inspection parts from said measurement values obtained from said measuring means.

7. The device for checking positional accuracy according to claim 6, wherein said converting means includes a photosensor scanned by said scattered light components to provide successive photoelectric signals, each containing at least first and second photoelectric signal components, to said measuring means.

8. The device for checking positional accuracy according to claim 7, wherein said measuring means further comprises:
   operational amplifier means for differentially amplifying said first and second photoelectric signal components of said photoelectric signals from said photosensor and for producing differential signals corresponding to said respective photoelectric signals;
   zero-crossing detecting means for detecting zero crossings of said differential signals; and
   means for counting the interval between adjacent zero crossings detected by said zero-crossing detecting means.

9. The device for checking positional accuracy according to claim 6, wherein said light beam projecting means produces a laser beam in a direction at a predetermined angle with respect to said rotating disk member.

10. The device for checking positional accuracy according to claim 6, wherein said inspection parts are magnetic heads having head gaps.

11. A device for checking positional accuracy of components using a light beam, the characteristics of said light beam being selectively altered by said components, said components moving at a constant speed across the path of said light beam, comprising:
   photosensor means adapted for converting light whose characteristics have been selectively altered into first and second photoelectric signals;
   differential amplifier means for producing differential output signals indicative of said photoelectric signals;
   means for detecting zero crossings of said differential output signals from said differential amplifier; and
   means for counting the intervals between adjacent zero crossings detected by said zero-crossing detecting means.

12. A device for checking position accuracy of inspection parts on a moving object, said object having a plurality of inspection parts mounted in a predetermined positional relation to one another, said device comprising:
   means for radiating a light beam in a fixed direction toward said object;
   means for converting scattered light components, successively scattered by said inspection parts, into electric signals indicative thereof,
   photosensor means, within said means for converting, which is scanned by scattered light from each of said inspection parts, for producing at least first and second photoelectric signals;
   means for measuring signal intervals of said electric signals comprising:
      (a) operational amplifier means for producing differential output signals, each having a zero crossing from said first and second photoelectric signals from said photosensor,
      (b) means for detecting said zero crossings of said differential output signals from said operational amplifier, and
      (c) means for counting the interval between adjacent zero crossings detected by said zero-crossing detecting means; and
   means for calculating the precision of said positional relation among said inspection parts from said measurement values obtained from said measuring means.

13. A device for checking positional precision comprising:
   a rotating disk member having a plurality of inspection parts mounted thereon along an edge thereof in a predetermined positional relation to one another, said inspection parts each having a light scattering section;
   means for projecting a light beam toward said rotating disk member;
   means for converting scattered light components, successively caused by said light scattering sections of said inspection parts, into photoelectric signals, including a photosensor, scanned by said scattered light components, to provide successive photoelectric signals to said measuring means, each said photoelectric signal containing at least first and second photoelectric signal components; and
   means for calculating the accuracy of said positional relation among said inspection parts from the measurement values obtained from said measuring means.

14. A method for checking the positional precision of components mounted on a rotating disk member, comprising the steps of:
   projecting the light beam in a fixed direction towards said rotating disk member;
   converting light reflected by said components on said rotating disk into photoelectric signals indicative thereof;
   measuring signal intervals of said photoelectric signals; and
   calculating the accuracy of the positional relation among said components from said measurement values.

* * * * *